United States Patent [19]

Silenius

[11] Patent Number: 4,895,241

[45] Date of Patent: Jan. 23, 1990

[54] APPARATUS FOR DISTRIBUTION OF LOGS INTO GRINDER SUPPLY SHAFTS

[75] Inventor: Seppo Silenius, Kartano, Finland

[73] Assignee: Kone OY, Hyvinkaa, Finland

[21] Appl. No.: 190,097

[22] Filed: May 4, 1988

[30] Foreign Application Priority Data

May 5, 1987 [FI] Finland .................................. 871990

[51] Int. Cl.$^4$ ............................................. B65G 47/46
[52] U.S. Cl. .................................... 198/358; 198/359; 198/371; 198/464.2
[58] Field of Search ............... 198/356, 358, 359, 363, 198/365, 371, 464.1, 464.2, 464.3, 572, 573, 575, 568, 569

[56] References Cited

U.S. PATENT DOCUMENTS

| | | | |
|---|---|---|---|
| 3,310,080 | 3/1967 | Delcellier | 198/358 X |
| 3,426,885 | 2/1969 | Rupert | 198/573 |
| 3,512,662 | 5/1970 | Strydom | 198/572 X |
| 3,749,326 | 7/1973 | Aro | 198/569 X |
| 4,280,611 | 7/1981 | Molins et al. | 198/575 X |

FOREIGN PATENT DOCUMENTS 0045118  3/1972  Finland.
0045243  4/1972  Finland.

Primary Examiner—Robert J. Spar
Assistant Examiner—Lyle Kimms
Attorney, Agent, or Firm—Lowe, Price, LeBlanc, Becker & Shur

[57] ABSTRACT

Apparatus is disclosed for the distribution of logs into the supply shafts of a plurality of successive grinders from a conveyor line consisting of several belt, chain or other conveyors placed in succession and carrying the logs transversely thereon. The logs are passed from one conveyor to the next and distributed into supply shafts through gaps between the conveyors, which are automatically started for moving the logs on the conveyor line so as to fill the supply shafts. The equipment previously known and used for this purpose has several disadvantages, e.g. the need for sorting of the logs, unnecessary operation of the conveyors, overfilling of the line, etc. The present invention obviates these drawbacks in that the line is provided with sensors for sensing the height of the stack of logs on the conveyor line above each grinder supply shaft, at least two sensors being located above the level of the conveyors so as to control the conveyors adjacent to the shaft, so that they will be started, in motion either simultaneously or separately towards the supply shaft therebetween to ensure that there is always a sufficient supply of logs at the grinder.

7 Claims, 2 Drawing Sheets

APPARATUS FOR DISTRIBUTION OF LOGS INTO GRINDER SUPPLY SHAFTS

FIELD OF THE INVENTION

The present invention relates to an apparatus for the distribution of logs into the supply shafts of several successive grinders from a conveyor line consisting of several belt, chain or other conveyors placed in succession and carrying the logs transversely thereon. The logs are passed from one conveyor to the next and distributed into the supply shafts through the log-filled gaps between the conveyors, which are automatically started in motion to move the logs on the conveyor line so as to fill any shaft which is short of logs.

DESCRIPTION OF THE PRIOR ART

At present, there are several kinds of apparatus in use for this purpose. As the logs descend in the supply shafts, more logs are supplied into them. When a shaft is full, the new logs supplied are pushed over those already in the shaft onto the next conveyor.

The logs descend in the shaft at a relatively low rate, e.g. approximately 10 cm/min. Therefore, the conveyors need not be running continuously but are automatically started at certain intervals and kept running for a few seconds at a time to move the logs forward on the line and fill the supply shafts. The starting interval may be selectable, e.g. between 1 and 10 minutes and the separate running time for each conveyor may be, e.g. between 5 and 30 seconds.

In addition, after each forward running period, the conveyors are automatically run in the reverse direction for a few seconds in order to break up any blockages that may have been formed in the supply shafts.

This kind of automatic apparatus, which is described in Finnish Patent No. 45243, has the following disadvantages:

Due to the running sequence of the conveyors, the logs carried on the conveyor line tend to be sorted so that above-average sized logs are gradually pushed up to the surface of the stack and passed towards the last grinder, with the result that the pulp obtained from that grinder is of an inferior quality compared to the pulp produced by the other grinders.

Moreover, the conveyors are controlled by a program apparatus using a certain predetermined sequence of running times. Since there is no feedback concerning the amount of logs on the line, the conveyors are often started before it is actually necessary, resulting in extra noise and wear of the belts as they slide on the conveyor drums.

The height of the stack of logs on the conveyor line may rise above the level of the higher side wall if the running times of the conveyors are inappropriately selected or if the operator wishes to store a larger amount of logs on the line to keep it running with fewer filling operations. This may result in logs falling over the line edge or turning into an oblique position because of the steep slopes formed on the stack.

Furthermore, it often happens that the logs do not move down through the shaft aperture even if the grinder and its feeder chains are running. Logs are sometimes stuck at the upper edge of the shaft, so that no logs can pass down the shaft. In this way, vault-like effect may be created below the blockage.

In the old control system, the formation of blockages in the supply shafts is supervised by means of pneumatic equipment placed in each of the local conveyor control boxes. Such equipment comprises two pressure switches and two nozzles, the latter being placed in the shaft wall. However, such blockage monitors seldom detect a blockage, and the conveyor movements are not always sufficient to break one up.

In the old control system, the conveyor movements can be controlled both from the local control boxes and from a central desk. However, the available selection of possible operations is limited. From each local box, the adjacent conveyors can be run forwards and backwards, and all the conveyors located towards the beginning of the line as seen from the box can be run forwards. From the desk, all the conveyors located before a given shaft can be run forwards. However, it has not been possible to run the conveyors located beyond the shaft as a group either forwards or backwards.

BRIEF SUMMARY OF THE INVENTION

An object of the present invention is to provide an apparatus which avoids or mitigates the disadvantages referred to.

Accordingly, the invention provides an apparatus for the distribution of logs into the supply shafts of a plurality of successive grinders from a conveyor line consisting of a plurality of conveyors placed in succession and capable of carrying the logs transversely thereon, the logs being passed from one conveyor to the next and distributed into the supply shafts through logfilled gaps between the conveyors, which conveyors are automatically started for moving the logs on the conveyor line so as to fill shafts which have an insufficient supply of logs, the line being provided with sensors for sensing the height of the stack of logs on the conveyor line above each shaft, at least two sensors being located at or above the level of each conveyor to control the conveyors adjacent to a given shaft, so that they may be started in motion either simultaneously or separately towards the supply shaft between them to ensure that there is always a sufficient supply of logs at the grinder.

Thus, the apparatus of the invention is characterized in that it is provided with sensors for sensing the height of the stack of logs on the conveyor line above each grinder supply shaft. At least two sensors are located above each shaft to control the adjacent conveyors so that they will be run either simultaneously or separately towards the supply shaft so as to ensure between them that there is always a sufficient supply of logs at the grinder.

In a preferred embodiment of the invention, when the amount of logs at a given point on the conveyor line decreases sufficiently, the stack height sensors will cause the conveyors up to the deficient area to be successively started in motion in the forward direction and stopped in turn so that the conveyor line is filled with logs to the edges of its side walls.

In another preferred embodiment of the invention, the conveyors which were used in the filling operation, beginning with the second conveyor, are run backwards in turn, e.g. for about 5 seconds, so as to even out the stack surface.

Yet another advantageous embodiment of the invention employs two stack height sensors for each shaft, arranged in succession in the direction of movement of the conveyors, in such manner that, as seen from the main direction of log supply, the first sensor above each shaft is located at a point higher than the second one.

The invention offers several advantages over solutions previously known in the art. The advantages include a reduction of the sorting effect, reduced conveyor running times, diminished risk of overfilling of the line, improved blockage detection and blockage alarm and increased possibilities of manual operation of the conveyors, Since the operation of the conveyor line has been changed so that the conveyors next to a given grinder supply shaft convey the logs towards that shaft, the logs on the conveyors will not move further than the distance between two shafts before sinking into one of them. This is the case during the operation of both the grinder feeding program and the blockage breaking program. When the line filling program is started, the logs can move past several grinders towards the end of the line, but, after the filling operation, even large logs left high on the stack will often sink down into the grinder supply shafts.

In the new system, only the conveyors next to active grinders are started to supply logs to the grinder between them. If any of the grinders on the line is inoperative, the conveyors next to these grinders need not be active at all, except during the line filling program.

The sensors placed at the upper edge of the conveyor line wall (one sensor for each grinder) prevent the stack from becoming too high when the line is being filled, provided that the upper limit delay has been set at a low enough value, e.g. 1 second. The upper limits also prevent excessive stack height increases during operation of the feeding program. When the amount of logs on the line decreases, slopes begin to be formed in the areas between operative and inoperative conveyors. The slopes are prevented from becoming too steep by a program which evens out the stack.

If a blockage is formed in the upper part of a shaft, the blockage detectors almost invariably detect it. The conveyors are then run back and forth to break up the blockage.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENT

Figure 1:
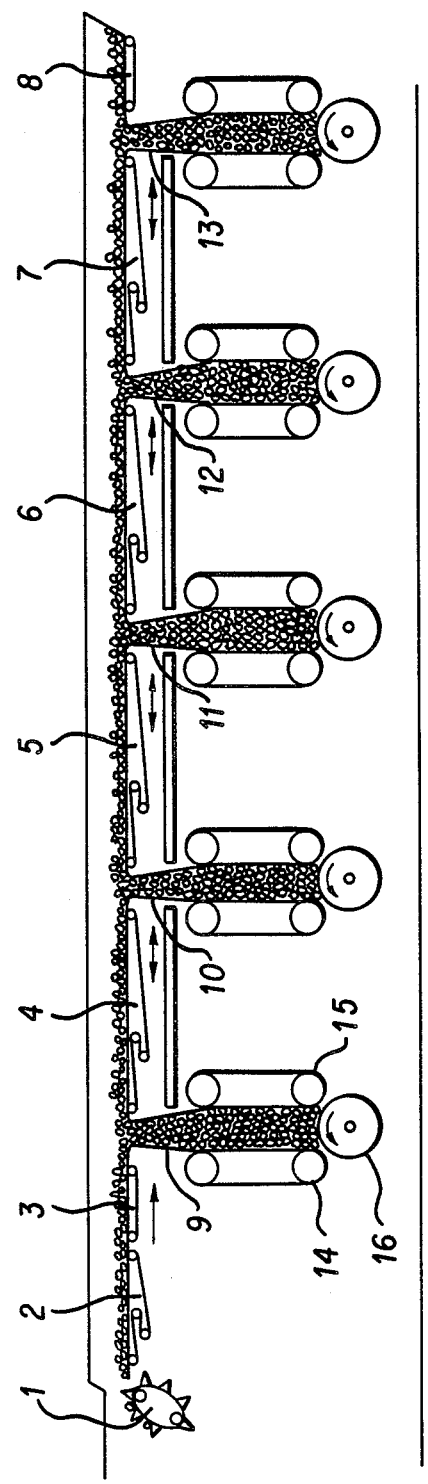
FIG. 1 is a diagrammatic lateral view of a conveyor line.

The logs are fed onto the conveyor line by an elevator 1 which places the logs onto a belt conveyor 2 in a transverse position relative to the direction of movement of the conveyor. The logs are then carried progressively further onto belt conveyors 3 to 8. The logs are able to fall through apertures between these conveyors into grinder supply shafts 9 to 13, which extend downwards. At the sides of the lower parts of the supply shafts 9 to 13 there are disposed endless chains 14 and 15 which press the logs against grinding stones 16.

Figure 2:
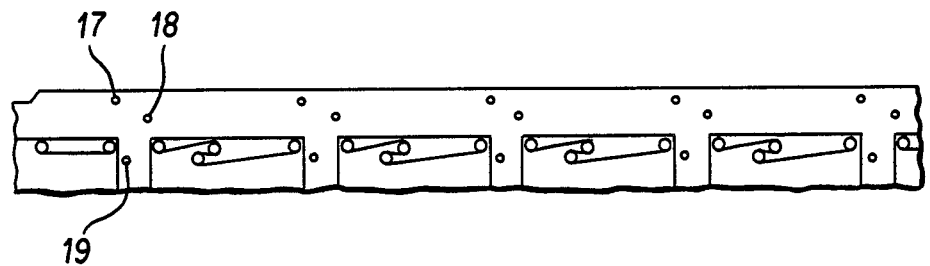
FIG. 2 is a diagrammatic representation of the location of the detectors used for sensing stack height and formation of blockages.

Above each shaft, the conveyor line walls are provided with stack height sensors 17 and 18 (FIG. 2). At the edge of each supply shaft there is a blockage detector 19.

The conveyors are controlled in accordance with the information provided by the stack height sensors 17 and 18. Generally speaking, the functions of the control system comprise five main operations: filling the line, feeding the grinders, breaking up blockages, evening out the stack and manual operation.

The purpose of the line filling program is to fill the conveyor line with logs up to the level of the higher side wall while taking care that the logs are substantially evenly distributed through the line. The stack height sensors prevent the stack from becoming too high. The essential point about the line filling program is that only those conveyors which are located before the area to be filled plus one conveyor beyond it are used in the filling operation. This arrangement ensures that grinder feeding programs that may be active for any of the conveyors beyond the area to be filled are not interrupted unnecessarily. The filling program is automatically started whenever the amount of logs on the line decreases to a certain level. The amount of logs on the line is indicated by the stack height sensors 17 and 18. The filling program can also be started from the central desk or the local control boxes, to fill a desired part of the line.

The grinder feeding program controls the conveyors adjacent to an active grinder in accordance with the signals provided by the upper and lower limit sensors 17 and 18, in such manner that a sufficient supply of logs is always available above the active grinder while ensuring that the stack does not rise beyond the line wall edge. The principle of operation is such that, when the stack height has decreased to a level below the lower limit sensor 18, the second conveyor is started after a certain delay in the backward direction. Once the stack height exceeds the lower limit 18, the second conveyor stops after a certain delay. Next, the first conveyor is started in the forward direction, unless the stack height already exceeds the upper limit 17. The first conveyor is stopped when the stack height exceeds the upper limit. Certain maximum running times are set for the conveyors so that they will stop at the latest when these maximum times have elapsed, unless the stack height has reached the upper limit before that.

The blockage breaking program is designed to break up the blockages automatically, using the conveyors adjacent to the shaft in question. The presence of a blockage is detected by a sensor placed at the edge of the supply shaft. If these are logs in front of the sensor, it will output a corresponding signal. On the other hand, if there are no logs in the shaft or an empty space between the logs is directly in front of the sensor, no signal is output. If the sensor output is in the '1' state (logs in front) or in the '0' state (no logs in front) for a time exceeding the set limit, the control unit will interpret this an a blockage, which means that the logs are not moving in the shaft. At this stage, the blockage breaking program is automatically started. The blockage is broken up by running the conveyors adjacent to the shaft alternately in the forward and backward directions in order to release the logs stuck above the shaft. The conveyors used for this operation are stopped as soon as the blockage has disappeared.

The system incorporates a stack redistribution program for evening out the stack of logs on the conveyor line at certain intervals so as to prevent the slopes on the stack from becoming too steep. This redistribution operation includes all the conveyors up to the last operative grinder on the line.

Using manual control, the conveyors can be run either from the desk or the local control boxes as follows:
Each conveyor separately, in both directions.
The conveyors up to or starting from a desired shaft as
  a group, in both directions:
    all the conveyors located to the left of the selected shaft
    all conveyors
    all the conveyors located to the right of the shaft.

Figure 3:
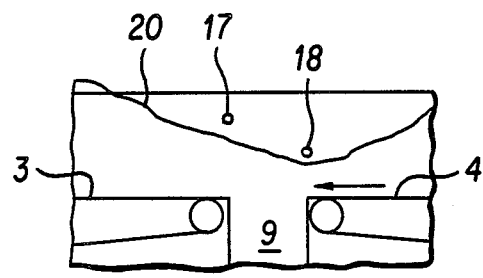
FIGS. 3 and 4 show diagrammatically two examples of how the conveyors work when controlled by the sensors.
Figure 4:
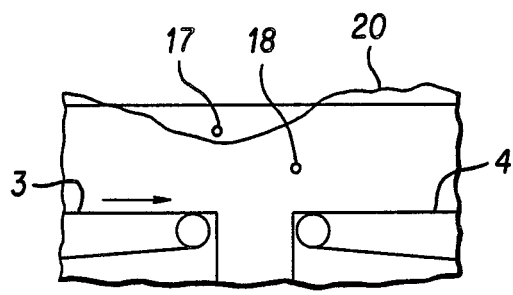

FIGS. 3 and 4 illustrate how the sensors 17 and 18 and the conveyors 4, 4 operate in different situations depending on the height and profile 20 of the stack on the line. In FIG. 3 conveyor 4 is running in a leftward direction, whereas in FIG. 4 conveyor 3 is running in a rightward direction.

It will be obvious to a person skilled in the art that the invention is not restricted to the above examples of its embodiments, but that it may instead be varied within the scope of the following claims.

I claim:

1. An apparatus for the distribution of logs into the supply shafts of a plurality of successive grinders from a conveyor line consisting of a plurality of conveyors placed in succession and capable of carrying the logs transversely thereon, the logs being passed from one conveyor to the next and distributed into the supply shafts through logfilled gaps between the conveyors, which conveyors are automatically started for moving the logs on the conveyor line so as to fill shafts which have an insufficient supply of logs, the apparatus comprising:
   a plurality of sensors for sensing the height of the stack of logs on the conveyor line above each shaft, with two of said plurality of sensors being located at or above the level of each conveyor such that each sensor of said two sensors is adapted to control a respective one of the conveyors adjacent to a given supply shaft, said line being further provided with at least one sensor in each of said supply shafts and adapted to control said adjacent conveyors adjacent each of said supply shafts, so that said adjacent conveyors may be started in motion either simultaneously or separately towards the supply shaft between them to ensure that there is always a sufficient supply of logs at the corresponding grinder.

2. An apparatus according to claim 1, wherein:
said conveyors are belt conveyors or chain conveyors.

3. An apparatus according to claim 1, wherein:
the stack height sensors are adapted to operate when a shortage of logs appears at a given point on the conveyor line to cause the conveyors located in advance of the log-deficient area to be successively started in motion in a forward direction toward said log-deficient area and stopped, in turn, so that the conveyor line is filled with logs to the edges of its side walls.

4. An apparatus according to claim 3, wherein:
the conveyors used in the filling operation, beginning with the second conveyor used, are adapted to run backwards away from an area that has a surplus of logs, in turn, so that the stack surface thereat is substantially even out.

5. An apparatus according to claim 4, wherein:
said conveyors are each run backwards for approximately 5 seconds.

6. An apparatus according to claim 1, wherein:
two stack height sensors are provided for each supply shaft and are arranged in succession in the direction of movement of the conveyors is such a manner that, as seen from the main direction of log supply, the first sensor above each shaft is located higher than the second sensor.

7. An apparatus according to claim 1, wherein:
said one sensor is disposed below the conveyor level and operates after the elapse of a predetermined delay and also when the logs have remained immobile for a time exceeding a set limit to actuate said adjacent conveyors to run alternately in the forward and backward directions.

* * * * *